July 25, 1961     W. E. THOMAS     2,993,692
AUTOMATIC COLLATORS Filed Sept. 17, 1958                           8 Sheets-Sheet 1

INVENTOR
WILBUR E. THOMAS

July 25, 1961 W. E. THOMAS 2,993,692
AUTOMATIC COLLATORS
Filed Sept. 17, 1958 8 Sheets-Sheet 2

INVENTOR
WILBUR E. THOMAS

July 25, 1961  W. E. THOMAS  2,993,692
AUTOMATIC COLLATORS

Filed Sept. 17, 1958  8 Sheets-Sheet 7

INVENTOR
WILBUR E. THOMAS.

United States Patent Office 2,993,692
Patented July 25, 1961

2,993,692
AUTOMATIC COLLATORS
Wilbur Evan Thomas, 165 Hillcrest Drive,
Pacanack Lake, N.J.
Filed Sept. 17, 1958, Ser. No. 761,553
11 Claims. (Cl. 270—58)

The instant invention relates to collators of the type shown in my prior Patent 2,399,584, issued April 30, 1946, primarily intended for use in offices and the like for the production of various types of pamphlets, memoranda or other booklets of limited number of pages.

A primary object of the instant invention is the provision of improved collators of the kind referred to adapted to operate with greater efficiency than those heretofore employed. Collators of the type under consideration conventionally comprise a vertical series of shelves or trays each containing a stack of paper sheets the sheets of each stack constituting one sheet of the collated material. Means are provided for simultaneously removing the uppermost sheet of a stack in each tray by sliding it forwardly, the forward edges of the several sheets as they issue from the trays tending to collect together by gravity in a position to be grasped and withdrawn as a unit or group by the operator. The group of superposed sheets thus gathered are then ordinarily jogged by the operator to bring the edges of the sheets into alignment, the sheets of the group stapled together and any other desired operation performed on it. The collating operation is then repeated this continuing until the job is completed.

The collating cycle described above is conventionally initiated by a manual operation, for example by the depression of a foot pedal which through a mechanical means simultaneously ejects a sheet from each of the several stacks, as illustrated by said prior patent, or by the closing of a switch controlling an electric motor which in turn operates the ejecting means. In both cases the operator motivates the machine and therefore the speed of operation is directly controlled by the operator. Inasmuch as a definite sense of timing or rhythm is required on the part of an operator to obtain maximum output, which sense is often lacking, the production is inclined to be erratic.

A principal object of the instant invention is the provision of an improved collator of the general type of that described above but embodying means for automatically initiating the operating cycle at predetermined intervals. The timing means is adjustable to permit the intervals between operations to be set in accordance with the skill of the operator, the amount of additional work to be done in connection with sets of collated sheets, etc.

A further object of the invention is the provision of a collator driving means including means for stopping the machine at the completion of a collating cycle and means for automatically starting the operation at the end of a predetermined time interval.

Another object of the invention is the provision of a collator driving means comprising an electric circuit including a power switch, a driving motor, means for maintaining the circuit in normally closed condition to drive the motor upon the closing of the main switch, means for opening the circuit to stop the motor after the completion of a collating cycle, and an adjustable timer operable to close the circuit and initiate another collating cycle after a predetermined interval of time.

A collator in accordance with the instant invention and attaining the foregoing objects has numerous advantages over the previously known types. The operator has only to turn on the power switch, the collator thereafter taking over and producing each set automatically at predetermined intervals. No particular timing rhythm or coordination is required on the part of the operator as the collator controls the operator rather than the opposite as is presently the case. The provision for adjustment of the timer enables the intervals to be set in accordance with the skill of the particular operator, and the time required for the additional operations she must perform before she is ready to receive a following set.

The timing device may take different specific forms. However in each of the several embodiments, which will hereinafter be more specifically defined, it includes a reversible synchronous motor adapted to oscillate through an arc of pre-determined extent and close a switch to initiate the collating cycle.

My invention will be more fully understood and further objects and advantages thereof will become apparent when reference is made to the detailed description thereof which is to follow and to the accompanying drawings in which.

Figure 1:
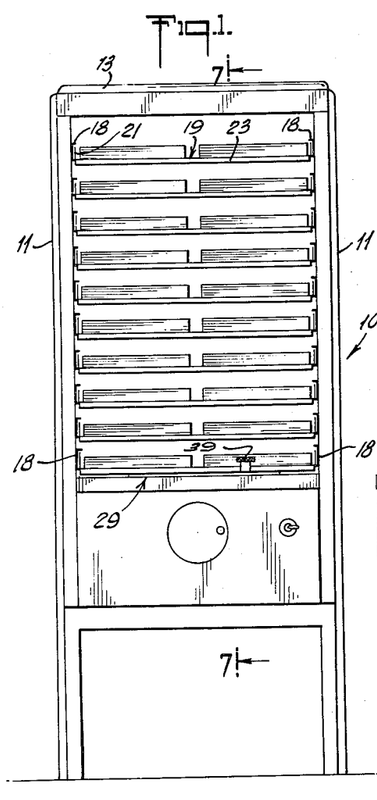
FIGURE 1 is a front elevational view of a collator embodying the instant invention.
Figure 2:
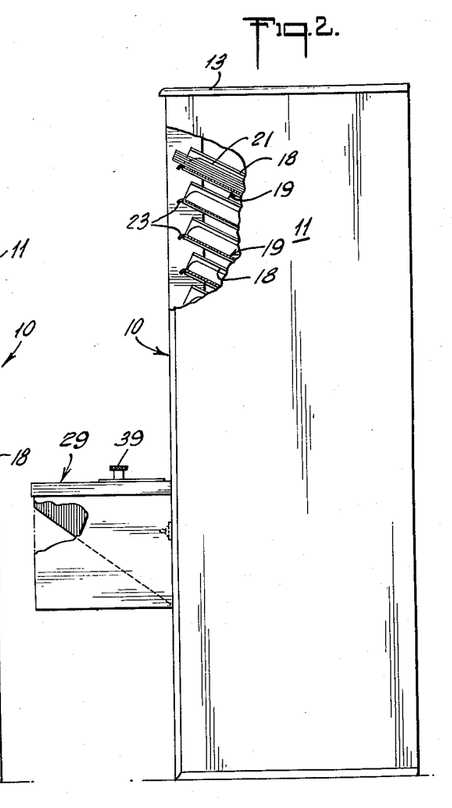
FIG. 2 is a side elevational view of the collator of FIG. 1.
Figure 3:
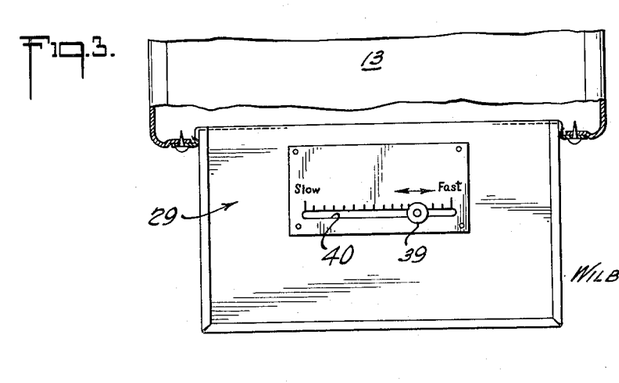
FIG. 3 is a partial plan view, with parts in section and on an enlarged scale, of the collator of FIGS. 1 and 2.
Figure 4:
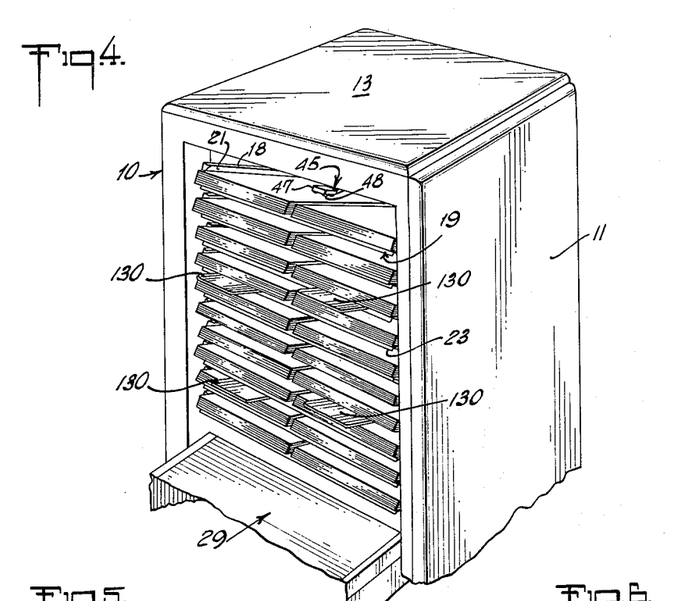
FIG. 4 is a perspective view of the upper portion of the collator of FIGS. 1 and 2, particularly illustrating the separator feature of the instant invention.

Referring now to the drawings and more particularly to FIGS. 1 and 2 a collator in accordance with the instant invention comprises an open front housing 10 including side panels 11, a back panel 12 and a top panel 13 all suitably formed of sheet metal. Within the housing are front and back vertical frame members 14 and 15 respectively (see FIGS. 7 and 11) adjacent each of the side panels 11. Each pair of frame members 14 and 15 carry an upper cross member 16 and a lower cross member 17. The frame members may be secured together in any suitable manner as for example by bolts, rivets, or the like, and similarly the housing panels may be secured together and to the frame member by any suitable means, the particular construction of the housing and frame not being material to the instant invention.

Carried by each pair of the frame members 14 and 15 are a plurality of vertically spaced opposed channel members 18 extending at an angle to the horizontal with their upper ends adjacent the open front of the housing 10 to provide supports for a plurality of removable trays or shelves indicated generally at 19. Each of the trays (see particularly FIGS. 7, 12, 14 and 19) include a bottom wall 20, side walls 21, and a rear end member 22 the latter serving as an abutment member to rest against the rear panel of the housing. The tray also includes a forward lip 23 serving as a means for grasping the tray for its removal in a manner to be hereinafter more fully explained.

Both the housing 10 and the trays 19 are suitably dimensioned to receive one or two stacks of paper sheets, the depth of the trays being selected to accommodate the longest sheet normally employed. Where two stacks are provided for in each tray, as illustrated in the drawings, a double collating operation takes place upon each machine cycle. It will be understood however that this feature is not critical and the collator may be dimensioned to receive but a single pile of sheets in each tray without affecting the inventive features herein described and claimed.

Figures 7, 8, 9, 10:
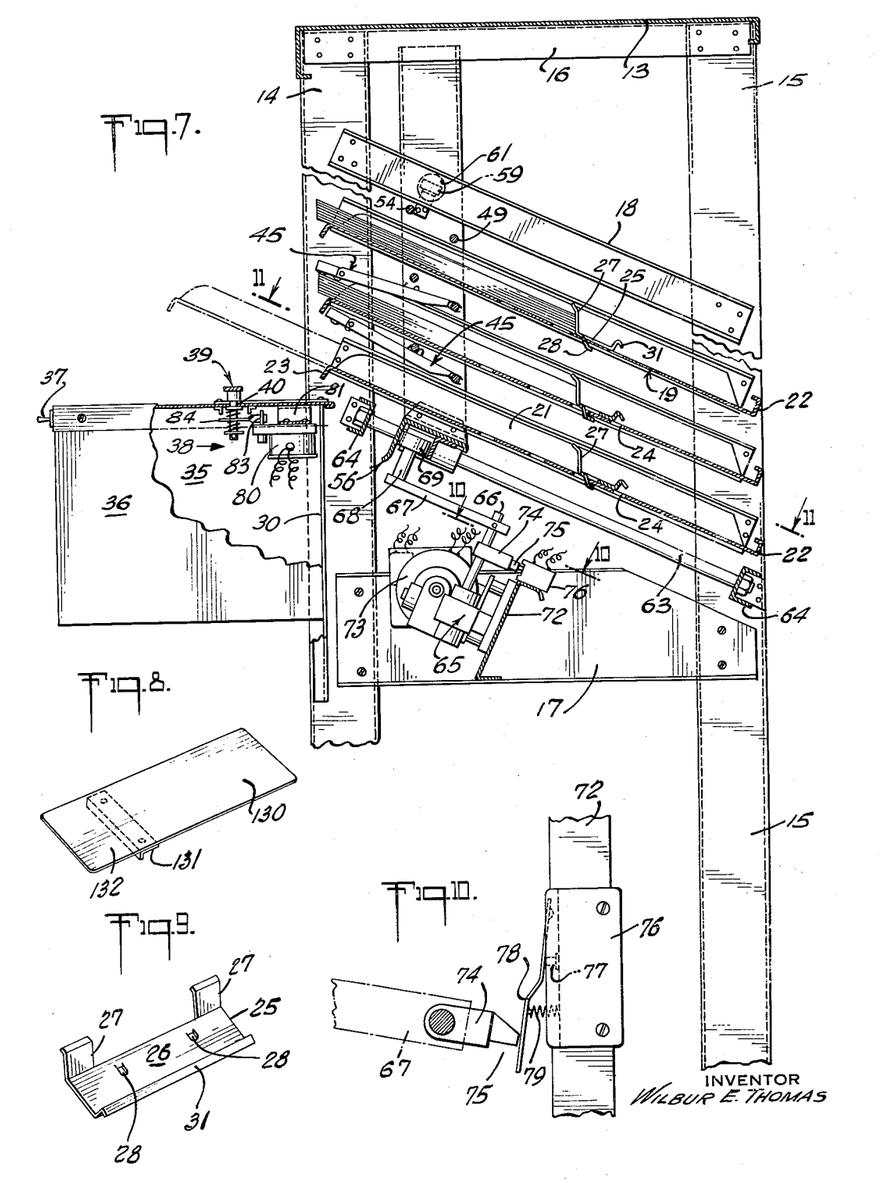
FIG. 7 is a sectional view on an enlarged scale taken on line 7—7 of FIG. 1.
FIG. 8 is a perspective view of one of the separator plates shown in operative position in FIGS. 4 to 7, inclusive.
FIG. 9 is a perspective view of a backstop employed in the trays or shelves of the collator of FIGS. 1 to 7, inclusive.
FIG. 10 is a sectional view on an enlarged scale taken on the line 10—10 of FIG. 7.
Figure 11:
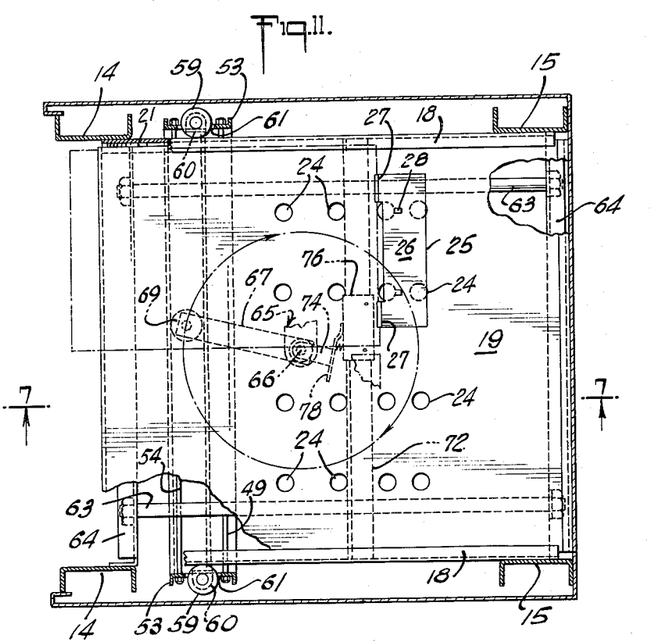
FIG. 11 is a sectional view taken on the line 11—11 of FIG. 7 with parts broken away for clearness of illustration.
Figure 12:
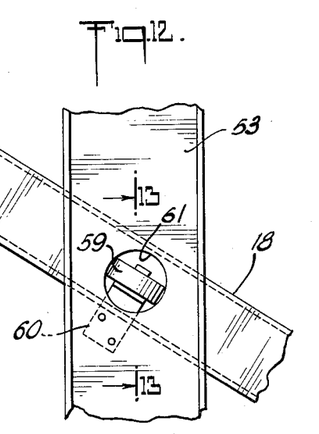
FIG. 12 is a detail view on an enlarged scale of a tray supporting means.

Referring particularly to FIGS. 7 and 11 the bottom panel 20 of each tray is provided with a number of transverse lines of perforations 24 spaced from the front edge of the tray at different distances corresponding to the different lengths of standard sheets to be collated. The rows of perforations serve to position backstops 25, two of such backstops being shown in the arrangement illustrated in FIGS. 7 and 9 where two laterally adjacent stacks of sheets are accommodated in each tray. The backstops which are suitably made of sheet metal each comprise a flat bottom member 26 adapted to rest on the bottom of the tray, upwardly and forwardly extending prongs 27 suitably integrally formed with the member 26 and a rear flange 31. Struck out from the bottom of the member 26 and suitably spaced to conform with the lateral spacing of perforations 24 are downwardly and rearwardly extending detents 28. As will be readily apparent the backstops may be placed in any adjusted position permitted by the spacing of the rows of perforations 24 by simply inserting the detents 28 through the perforations and forcing the backstops rearwardly into locked position. Prongs 27 suitably extend at an obtuse angle with respect to the member 26 to lie substantially vertically of the collator whereby the forward ends of the sheets supported in the trays similarly are in substantially vertical alignment.

It will be clear from the foregoing description the backstop permits the effective length of the tray to be adjusted, within reasonable tolerances, in accordance with the length of the particular paper sheets to be collated. Furthermore the backstops so position the stacks of sheets in the trays that the projection of the forward ends of the sheets is sufficient to permit them to be readily grasped and withdrawn.

Extending forwardly of the front of the collator and below the forward end of the lowermost tray 19 is a shelf 29. The shelf, which is secured in any suitable way to the collator housing or frame, includes a downwardly extending back wall 30 and end walls 35 and 36 respectively. The shelf provides a platform for jogging, stapling and other handling of the collated sets of sheets and further supports a starting switch 37 located for easy access by the operator. It also provides accommodation for a manually operated adjustment means for a timing device located beneath the shelf and indicated generally at 38, hereinafter to be fully described, the adjusting means including thumb screw 39 having a shank projecting through an elongated slot 40 in the shelf and forming a portion of the timer.

Figure 14:
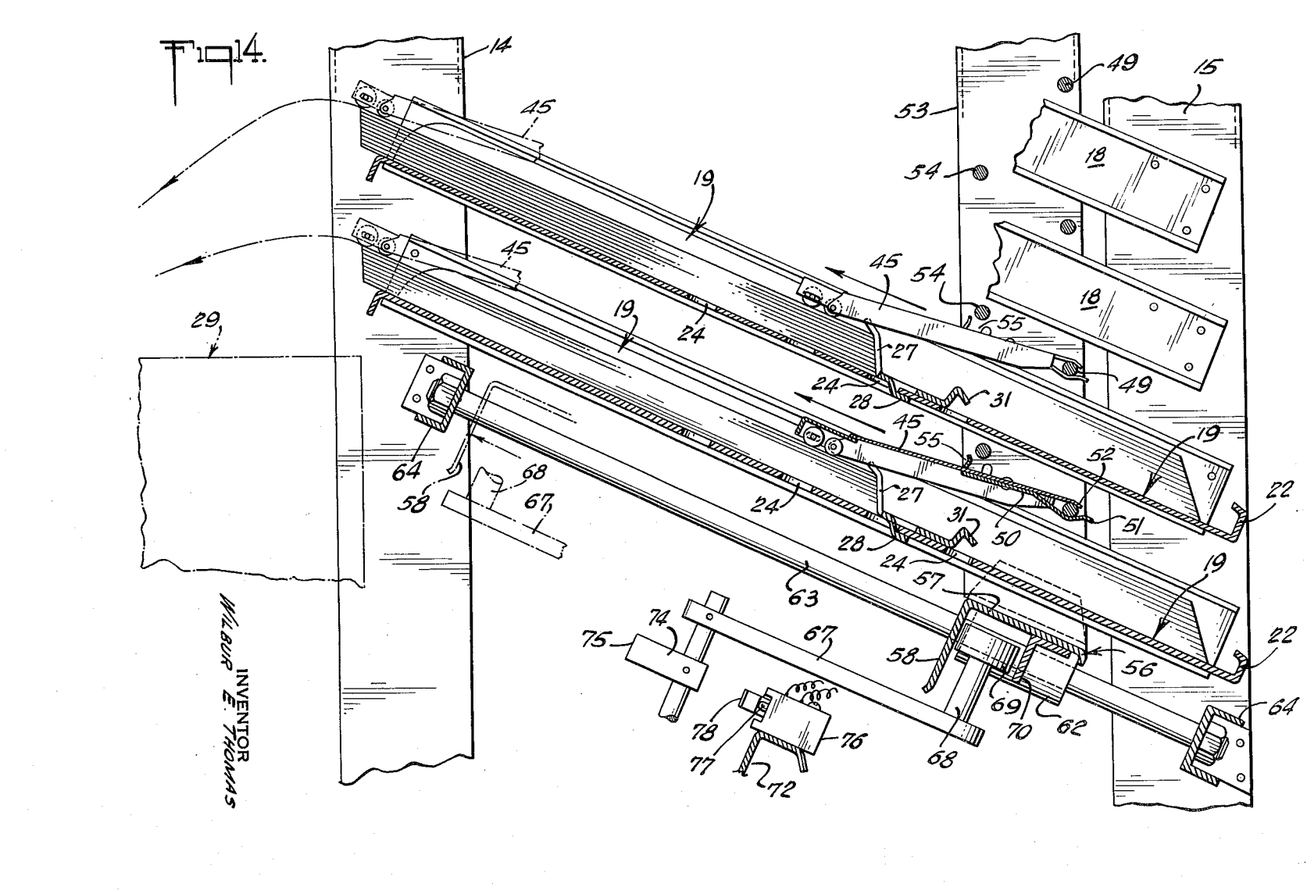
FIG. 14 is a sectional view on an enlarged scale similar to a portion of FIG. 7.
Figure 15:
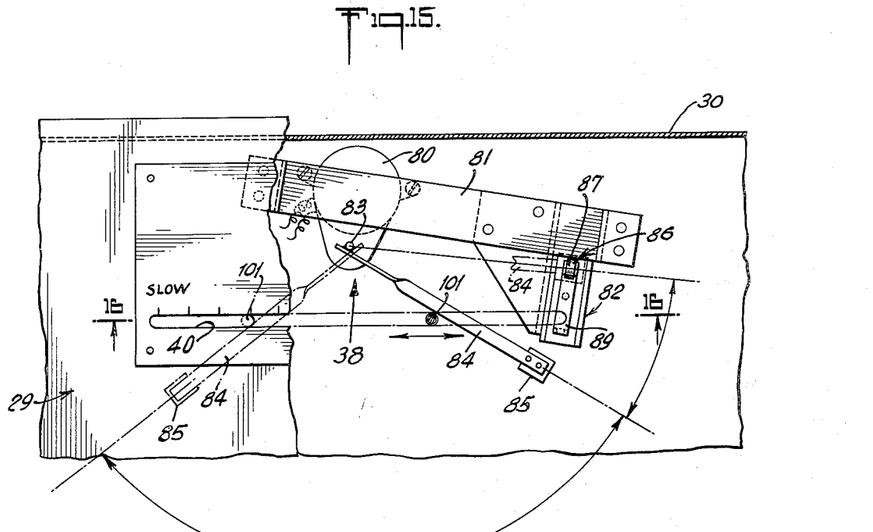
FIG. 15 is an enlarged detail plan view of the timing mechanism with parts broken away for purposes of illustration.
Figure 16:
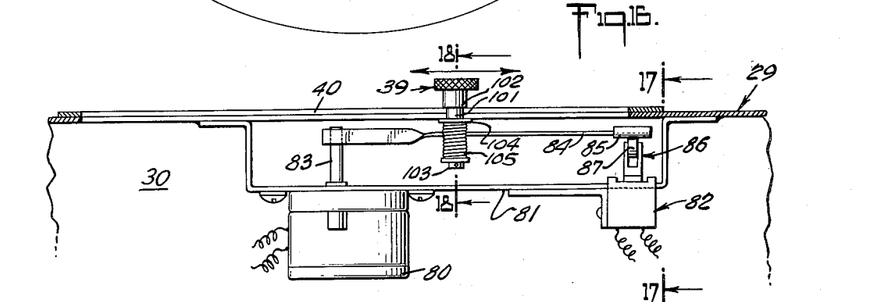
FIG. 16 is a sectional view taken on the line 16—16 of FIG. 15.
Figure 17:
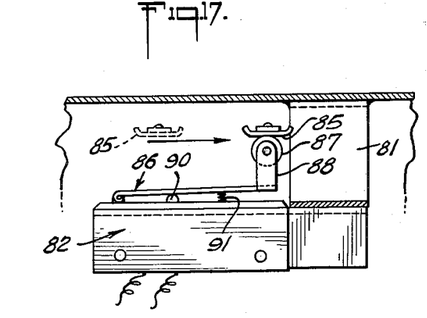
FIG. 17 is a sectional view on an enlarged scale taken on the line 17—17 of FIG. 16.
Figure 18:
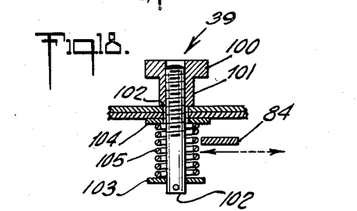
FIG. 18 is a detail view on an enlarged scale taken on the line 18—18 of FIG. 16.
Figure 19:
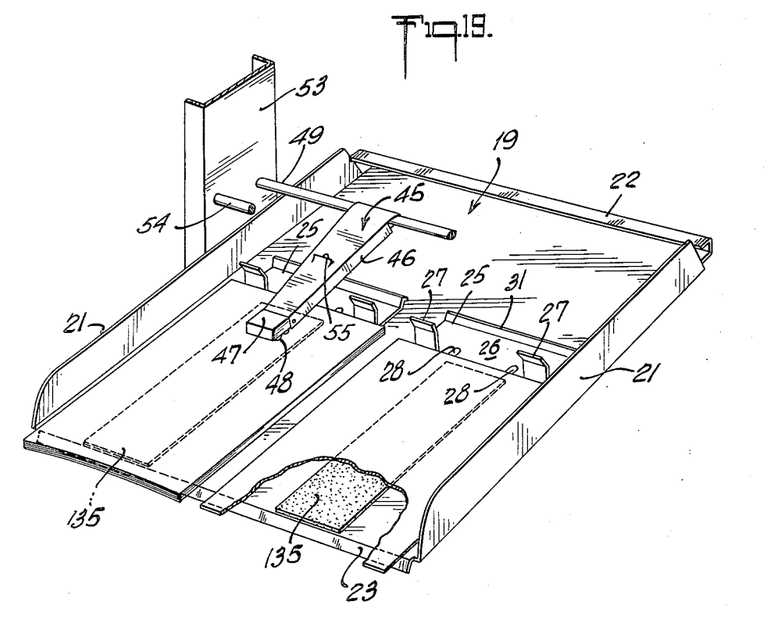
FIG. 19 is a perspective view of a tray supporting stacks of sheets and depicting a further feature of the invention.

Referring now to FIGS. 7, 14 and 19 generally conventional means for ejecting individual sheets from the stacks in the trays will be described. The ejecting means comprises a finger 45, two of the fingers being provided for in each tray where the latter accommodates two laterally adjacent stacks of sheets, as illustrated. The ejector fingers, the particular construction of which is described in my prior Patent 2,844,370, issued July 22, 1958, each include a channel shaped main arm 46 and a forward finger portion 47 including a friction member 48 adapted to rest upon the uppermost sheet of a stack of sheets and move the sheet forwardly as the ejector member moves forwardly, i.e. toward the open front of the collator. The several ejecting fingers 45 are supported for forward and rearward reciprocating movement on a series of rods 49, one of said rods overlying each tray. The fingers are also rockably mounted on the rods whereby the friction members carried by their forward portions rest on and press against the uppermost sheet of a stack irrespective of the height of the stack. The mounting for each finger includes a plate 50 made of spring steel or the like riveted or otherwise secured to the underside of the finger and extending rearwardly to form one jaw 51 of a spring clamp embracing its rod 49. The other jaw 52 of the clamp is formed by a rearward extension of material of the finger, the jaws 51 and 52 being suitably bent or shaped to releasably grip the rod 49. As will be understood this construction permits the fingers to be readily removed and replaced. The ends of rods 49 are secured in channel members 53 extending vertically adjacent the side panels of the housing 10.

A second series of rods 54 also extend between channel members 53. Rods 54 are adapted to cooperate with a spring clamp 55 carried by each of the feed fingers to maintain the feed fingers in an inoperative position when the paper receiving tray is to be removed for refilling or for some other reason. As illustrated clamps 55 may comprise a flange on an end of plate 50 which projects through an opening in arm 46, and a detent struck out from the material of the arm.

Figure 13:
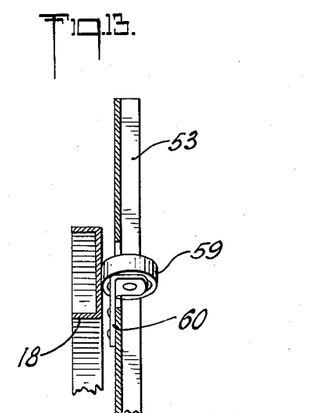
FIG. 13 is a sectional view taken on the line 13—13 of FIG. 12.

Channel members 53 are rigidly secured at their lower ends to the opposite ends of a cross member 56 which includes a base 57 and a forward flange 58 extending downwardly therefrom at right angles thereto. Adjacent the free upper ends of the members 53 and opposite the uppermost channels 18 the members 53 carry rollers 59 adapted to ride on the rear faces of the channels. As illustrated particularly in FIGS. 12 and 13 each of the rollers is supported on a bracket 60 secured as by rivets or the like to its associated member 53. A perforation or opening 61 is provided in each member 53 to accommodate the roller.

Cross member 56 carries bearing members 62 adjacent its opposite ends, the bearing members being mounted for sliding engagement on a pair of rods 63 extending between the front and back of the housing in parallelism to each other and to the trays 19. Rods 63 are supported by channel members 64 which in turn are secured to frame members 14 and 15. As will be apparent, forward and rearward movements of the members 56 will cause similar movements of channel members 53 and hence of the rods 49 which in turn will communicate similar movements to each of the fingers 45. FIG. 14 illustrates in full lines the positions of the finger elements and their supporting means when in their rearward positions ready to start the sheet ejecting operation, and further illustrates, in dot and dash line, the forward positions of these elements with the top sheets of the stacks substantially ejected and in position to be removed as a group by the operator.

The mechanism for reciprocating the feed fingers, and associated mechanism, between forward and rearward positions (see FIGS. 7, 11 and 14) includes an electric motor 65 underlying the several trays, the motor having a shaft 66. Secured adjacent the free end of the shaft 66 is an arm 67 carrying a stud 68 extending at right angles from the arm toward member 56. A roller 69 is mounted for free rotation adjacent the end of the stud. Roller 69 is accommodated in a channel or track extending horizontally beneath member 56 and defined by the forward flange 58 and a flange 70 of an angle iron 71 secured as by welding to the underface of member 56.

Motor 65 is mounted on a plate 72 extending between and secured to cross frame members 17. Associated with motor 65 is a brake 73 of any suitable or conventional type adapted to assert a braking action on the motor shaft when the circuit to the motor is opened and to release the braking action when the circuit is closed. For example the brake may be operated by a solenoid connected into the motor circuit, the solenoid when energized releasing the brake.

Motor shaft 66 carries a second arm 74 having a cam end 75 adapted, upon each rotation of the motor shaft, to open a normally closed micro switch 76. Opening of the switch 76 is accomplished by the depression of a button 77 which underlies a spring arm 78 secured at one end and having its other end in a position to be contacted and depressed by the cam end 75. Spring arm 78 is normally held outwardly by a compression spring 79. As will be later pointed out in detail, closing of the motor circuit causes the motor to rotate shaft 66 from a starting point in which the arm 67, its associated roller 69 and the mechanism driven thereby are in the full line positions of FIG. 7 to the full line positions of FIG. 14 and then back to the starting point. As the shaft completes its revolution cam end 75 opens micro switch 76 to break the circuit and energize the brake 73 to immediately stop the rotation of the motor and the movements of the ejecting mechanism driven thereby. During each complete revolution of the motor 65, channel members 53 and feed fingers 45 are caused to move through a complete stroke of reciprocation.

Referring now particularly to FIGS. 15 to 18, inclusive, the construction and operation of the timing device and its cooperation with the other parts of the driving means will be described. The timing device 38 (see FIGS. 7, 15 and 16) includes a motor 80 connected to a power source for continuous energization when the switch 37 is in its "on" position. Timing motor 80 is a fractional horsepower synchronous motor of a well known commercially available type adapted to reverse its direction of rotation when its rotation in one direction is opposed. An example of a motor of this type for use in the instant invention is that manufactured by Cramer Controls Corp. identified as Type 117M Dual Rotation and carrying Patent No. 2,492,197. Motor 80 is carried by a bracket 81 which also supports a normally open micro switch 82. The motor includes a speed reduction gearing whereby its output shaft 83 rotates at a relatively low speed say six revolutions per minute. Shaft 83 projects upwardly of the bracket 81 and in the preferred embodiment of the timer construction disclosed in FIGS. 15 to 18, inclusive, carries an arm 84 rigidly secured to the shaft by welding to rotate or oscillate therewith. Arm 84 carries a striking member 85 and the arm is of sufficient length that in one position of the same member 85 overlies and depresses a contact element 86 of micro switch 82 to close the switch. Contact member 86 comprises a roller 87 mounted in a forked member 88 carried by a hinged arm 89. Arm 89 is normally urged by a spring 91 in a direction away from a button 90, to hold roller 87 in a position where it will contact and then ride under member 85.

The adjusting device or finger piece 39 is mounted in slot 40 as previously explained. This device, see particularly FIG. 18, suitably comprises a knurled head 100 having an integral portion 101 of reduced but sufficient diameter to overlie the material of the shelf at the margins of slot 40. Head 100 is threadably secured to a pin 102 of a diameter to fit loosely in the slot. A washer 103 is secured adjacent the lower end of the pin by a cotter key or the like. A second washer 104 is mounted on the pin adjacent the shelf and a compression spring 105 is interposed between the two washers. As will be obvious the adjusting device may readily be moved to any position in the slot and will be yieldably retained in such position under the force exerted by spring 105.

Upon energization of motor 80, as by the closing of switch 37, arm 84 is rotated with the motor shaft in the starting direction of the motor until it strikes either adjustment member 39 or overrides roller 87 and contacts a stop 107 secured to the underside of the shelf adjacent micro switch 82. Upon striking either the adjusting member or the stop the movement of the arm, and hence rotation of the motor, is brought to a halt whereupon the motor immediately reverses and swings the arm in the opposite direction. As will be readily understood, by placing the adjustment element 39 in different locations in the slot the extent of the angular movement of the arm 84 before its movement is reversed, and hence the interval of time before it can return to close the micro switch 82, can be readily adjusted. In the construction illustrated (see particularly FIG. 15) movement of the adjustment element to the right shortens the stroke and hence reduces the time interval. Similarly movement of the adjustment element to the left (see dotted line position) increases the time interval.

Motor 65 which provides the motive power for the sheet ejecting mechanism is connected to a source of electrical current through normally closed micro switch 76 as well as through main switch 37, the switch 37 also controlling the operating motor 80 as just explained. Normally open micro switch 82 which is closed only when its button is depressed by the timing means, is connected or shunted across micro switch 76 whereby when either switch 76 or 82 is closed, and assuming that switch 37 is also closed, current will be supplied to motor 65.

Hence in the operation of the timing device, as for example upon the start of a collating operation and assuming the ejector members to be in their forward positions as illustrated in FIG. 7, closing of master switch 37 energizes the circuit to the timing motor, but in view of the fact that cam 74 is in a position to depress and hold open normally closed switch 76 the circuit to motor 65 remains open. Rotation of motor 80 causes arm 84 of the timing device to swing through its path of movement or a portion thereof until it closes micro switch 82. Upon the closing of the switch 82 the circuit for motor 65 is closed for an interval defined by the time it takes motor 80 to reverse and move element 85 out of contact with the roller 87. This momentary energization of the driving motor 65 is sufficient to move cam end 75 off of control arm 78 of button 77 of switch 76 whereupon switch 76 closes to in turn close the drive circuit to the motor 65 and the latter continues to drive the collator through a collating cycle. During the collating cycle arm 67 is rotated from the position illustrated in FIG. 7 through an arc of 180° to draw the several feed fingers 45 to their rearward positions. Upon continued rotation of the motor, arm 67 is swung through a further arc of 180° to return to the position of FIG. 7. During this latter movement the feed fingers are moved forwardly to push the top sheet of each stack of sheets forwardly and out of the open front of the housing sufficiently for the free forward ends of the sheets to fall downwardly into a position to be grasped as a group or set by the operator. Also as the arm 67 completes its full revolution to return to the position of FIG. 7 cam end 75 again strikes the control spring arm 78 of button 77 of normally closed switch 76 to open the switch and hence open the circuit to the motor and energize brake 73 to abruptly stop the motor with switch 76 held in its open position.

During the collating cycle motor 80 drives arm 84 through an arc and in a direction away from the position in which it closed the contact of switch 82. Upon the arm 84 striking device 39 the direction of rotation of the motor is reversed and the arm again swings toward the contact member of switch 82. In the meantime the collating cycle has been completed and motor 65 comes to a stop. When the arm 84 reaches and depresses button 90 of the switch the circuit to the motor 65 is again energized and a new collating cycle initiated.

As will be readily appreciated the time interval between the completion of one collating cycle and the initiation of the next is determined by the time taken by the arm 84 to complete its movement to the adjusting device 39 and again to a position to close switch 82. This time interval may be determined in conformity with the skill of the operator, the operations required in connection with the sheets after their removal from the collator, etc., by positioning device 39 in the proper location in slot 40. The scale adjacent slot 40 may be employed to assist in setting the timing device in predetermined adjusted positions. It will be understood that the speed of rotation of shaft 83 is such that in any adjusted position of device 39 sufficient time will be consumed in the movement of arm 84 through a complete oscillation to permit the collator to complete the cycle.

The arrangement described above eliminates any requirement for the operator to initiate each collating cycle. She may adjust the device 39 to secure the time interval between cycles required by her particular skill and the operations which she must perform. Once this adjustment is made the collator will operate automatically with no further attention from her. Hence the sense of timing or coordination as required for manual operation, is no longer necessary.

While the preferred embodiment of the timing mechanism is described above the same may be modified in various ways and the smae or similar advantages obtained. Referring now to FIGS. 22 to 25 inclusive and first to FIG. 22 a construction is illustrated in which the normally open micro switch for momentarily energizing the circuit to motor 65 is carried by the adjustable means rather than in fixed position. In this embodiment shank 101 of device 39 additionally carries a normally open micro switch 110 including a button 111 and a contact means comprising a leaf supported roller 112 the contact means in this instance being directly in the path of the arm 84 to depress the button and close the switch when contacted by arm 84. A fixed stop 113 is supported from the frame structure in a position to be contacted by arm 84 at the opposite end of its arc of oscillation. As will be readily understood the operation of the timer is the same as that of the previous embodiment.

Figure 23:
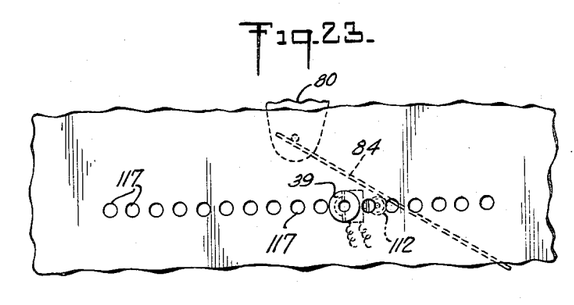
FIG. 23 is a view similar to a portion of FIG. 22 and illustrating a further modification.

Referring now to FIG. 23 a modification of the embodiment of FIG. 22 is disclosed. The general construction and operation is the same as before except that in lieu of elongated slot 40 a series of spaced perforations 117 are employed in which the adjustment means 39 carrying the normally open micro switch may be inserted.

As will be recognized this embodiment is not as easy of adjustment as where the slot is employed inasmuch as it is necessary to unscrew the thumb piece 100 to permit the stop to be removed from one perforation and placed in another. On the other hand the operator can be assured that the stop will not be accidentally moved from a preadjusted location. This feature may also be employed with the embodiment of FIGS. 15 to 18.

Figures 24, 25:
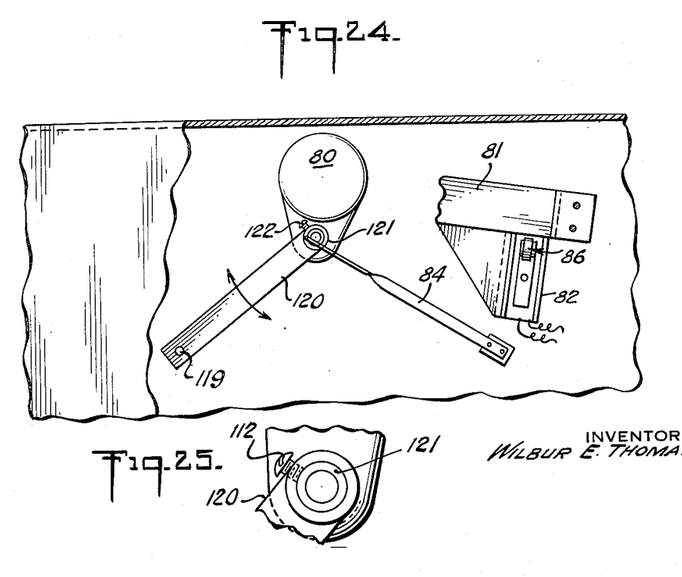
FIG. 24 is a view similar to FIG. 22 and illustrating a still further modification.
FIG. 25 is a detailed view on an enlarged scale of a portion of the construction shown in FIG. 24.

FIGS. 24 and 25 illustrate a further embodiment in which the slot 40 or a row of perforations is eliminated and a stop 119 is mounted on an arm 120 secured in an adjusted position on a sleeve 121 of the motor housing. The arm 120 may be held in any adjusted position by a set screw 122. The operation of the device is the same as before except that to adjust the timer it is necessary to loosen set screw 122 rotate the arm to make the desired adjustment and then tighten the set screw.

Referring now particularly to FIGS. 4 to 8 inclusive the construction and operation of the separator means whereby the sheets, ejected simultaneously from the several superposed shelves or trays, may be separated into two or more sub-groups will be described. The separator 130 (see FIG. 8) suitably comprises a flat sheet of metal or the like to which is secured an angle member 131. Angle member 131 is located intermediate the ends of the separator to define a forwardly extending lip 132.

In the use of the separator (see particularly FIGS. 4 to 6 inclusive) one or more of the separators, depending upon the number of sub-groups into which the whole group of ejected sheets is to be divided, are positioned in appropriate tray or trays beneath the stack of sheets therein and with the flange defined by angle member 131 resting against the forward end of the tray.

Figure 5:
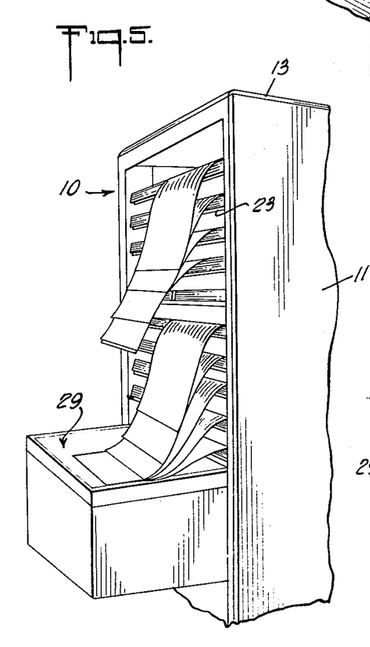
FIG. 5 is a view similar to FIG. 4 illustrating the operation of the separator means in grouping the sheets ejected from the trays into a plurality of sets or subgroups.
Figure 6:
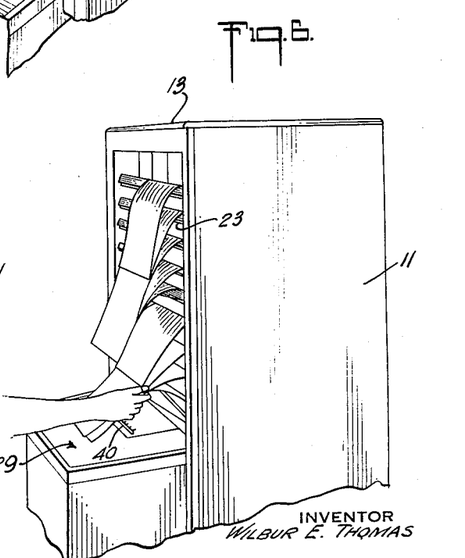
FIG. 6 is a view similar to FIG. 5 illustrating the manner in which the sheets are removed by the operator.

In the operation of the collator with the separators in place the sheet of the stack overlying the separator as it is ejected from its stack is supported for a relatively greater distance than the remaining sheets due to the pressure of the lip 132 whereby it separates the sheets as they are ejected into distinct sets each of which may be individually grouped and removed by the operator. Thus, as illustrated in FIGS. 5 and 6, the separation permits the operator to readily grasp the lower sub-group between her thumb and index finger. She can then transfer the sub-group to a position between the index and middle finger and remove the set above with the thumb and index finger, and repeat the operation if necessary. If the two or more sub-groups form one collated set she can then easily join the sub-groups into one complete set. This mode of operation is of particular importance when the number of superposed trays is such that the operator cannot readily grasp all of the ejected sheets at one time as previously explained. On the other hand when a relatively few sheets make up a full set the separators may be used to enable two or more of the sets to be collated simultaneously.

As previously mentioned a further feature of the invention resides in the provision of removable trays to make it easier to supply the trays with the stacks of sheets. The trays as previously described include a flat bottom wall 20, side flanges 21, rear end members 22 and forward lip 23 and are supported in sliding engagement in channels 18. As will be apparent the tray may be removed simply by grasping the lip 23 and sliding the tray upwardly and forwardly out of the channel members and, after loading, replaced by the reverse operation.

Figure 20:
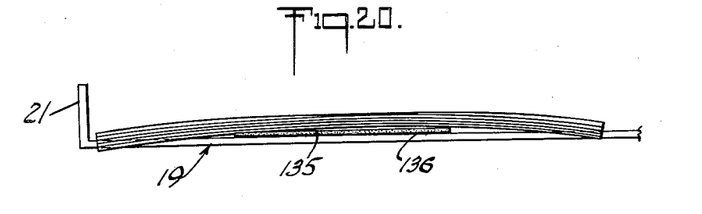
FIG. 20 is a sectional view on an enlarged scale on the line 20—20 of FIG. 19.
Figure 21:
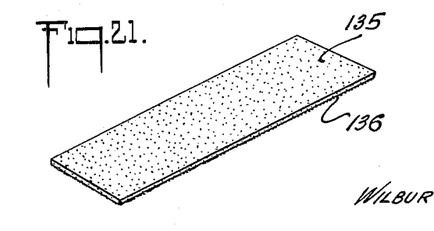
FIG. 21 is a detail view of a friction member employed in the tray of FIGS. 19 and 20.
Figure 22:
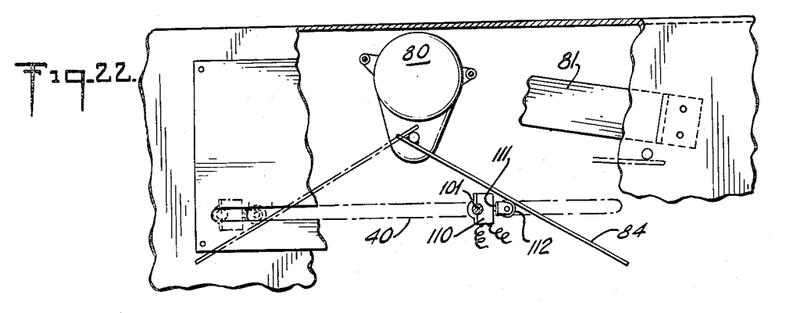
FIG. 22 is a view similar to FIG. 15 but depicting a modified form of the timing mechanism.

Referring now to FIGS. 19 to 21 a still further feature of the invention resides in the provision of means to assure individual delivery of the last few sheets of the stack of sheets. It has been found that when the stack is near exhaustion there is a tendency for the last two to ten sheets to be ejected simultaneously due to the bottommost sheet sliding on the relatively smooth tray. To overcome this difficulty a member is provided preferably comprising a strip 135 of cork or similar material having a friction surface. The strip has a width substantially less than the width of the paper in the stack and a length to extend from the front of the tray to or adjacent the backstop 25. The under surface of strip 135 is preferably provided with an adhesive layer 136 to insure that it will remain in its central position in the tray as illustrated in FIG. 19.

The strip serves to provide a friction surface which resists sliding movement of the paper and further serves as a means to maintain the sheets of the stack in somewhat bowed shape as illustrated in FIG. 20. As a result the sheets are properly positioned and shaped for efficient ejection and multiple sheeting as the pile or stacks near exhaustion is substantially eliminated.

Having thus described my invention in rather full detail it will be understood that these details need not be strictly adhered to and that various changes and modifications may be made all falling within the scope of the invention as defined by the following claims.

I claim:

1. In a collator comprising a plurality of superposed trays each adapted to support a stack of sheets, and sheet ejecting means including a reciprocable ejector element in each tray, means for initiating a collating cycle in which said ejecting means is operated to cause said ejector element to move through a complete reciprocation to eject sheets from said stacks, means for stopping the operation of said ejecting means upon the completion of such cycle, and means for automatically initiating a second collating cycle after a predetermined time interval, and means for selectively controlling the duration of said timed interval.

2. A collator as defined by claim 1 in which said ejecting means includes a motor drive, an electrical circuit for energizing said motor, a normally closed switch in said circuit, means operable upon the completion of a collating cycle to open said switch and open said circuit, a normally open switch connected into said circuit in parallel with said normally closed switch, and means for momentarily closing said normally open switch after said predetermined time interval to close said circuit and initiate a collating cycle, and means operable upon the initiation of a collating cycle to close said normally closed switch.

3. A collator as defined by claim 1 in which said ejecting means includes a motor drive, an electrical circuit for energizing said motor, a normally closed switch in said circuit, means operable upon the completion of a collating cycle to open said switch and open said circuit, a normally open switch connected into said circuit in parallel with said normally closed switch, and means for momentarily closing said normally open switch after said predetermined time interval to close said circuit and initiate a collating cycle, and means operable upon the initiation of a collating cycle to close said normally closed switch, said last named means comprising a continuously operating motor reversible upon resistance to rotation in either direction, and including a rotatable drive shaft, an arm supported by said shaft and adapted to be swung thereby through a path of movement, said means for momentarily closing said normally opened switch lying in said path and operable upon contact by said arm, and stop means in said path of said arm and defining the limits of movements thereof in both directions of rotation of said reversible motor, and means for adjusting the position of one of said stop means in said path.

4. In a collator, reciprocable sheet ejecting means, motor means for operating said ejecting means through a collating cycle comprising a complete reciprocation thereof, an electrical circuit for energizing said motor including a normally closed switch and a normally open switch with said circuit energized upon the closing of either of said switches, means for opening said normally closed switch upon the completion of a collating cycle to open said circuit, and means for momentarily closing said normally open switch after a predetermined time interval to close said circuit and initiate a collating cycle and to cause closing of said normally closed switch, said last named means comprising a synchronous motor reversible upon resistance to rotation in either direction, means to resist rotation of said synchronous motor after a predetermined rotation thereof in either direction to cause reversal thereof, and means operated by said synchronous motor during rotation thereof to close said normally open switch.

5. In a collator, reciprocable sheet ejecting means, motor means for operating said ejecting means through a collating cycle including a complete reciprocation thereof, an electrical circuit for energizing said motor including a normally closed switch and a normally open switch with said circuit energized upon the closing of either of said switches, means for opening said normally closed switch upon the completion of a collating cycle to open said circuit, and means for momentarily closing said normally open switch after a predetermined time interval to close said circuit and initiate a collating cycle and to cause closing of said normally closed switch, said last mentioned means comprising a synchronous motor reversible upon resistance to rotation in either direction and having a shaft, means carried by said shaft to be swung through a path of movement thereby in both directions of rotation of said synchronous motor, said means carried by said shaft comprising means to close said normally open switch during movement thereof, and spaced means cooperating with said means carried by said shaft to resist rotation of said synchronous motor after a predetermined rotation thereof in either direction to cause reversal thereof.

6. In a collator, reciprocable sheet ejecting means, motor means for operating said ejecting means through a collating cycle including a complete reciprocation thereof, an electrical circuit for energizing said motor including a normally closed switch and a normally open switch with said circuit energized upon the closing of either of said switches, means for opening said normally closed switch upon the completion of a collating cycle to open said circuit, and means for momentarily closing said normally open switch after a predetermined time interval to close said circuit and initiate a collating cycle and to cause closing of said normally closed switch, said last named means comprising a synchronous motor reversible upon resistance to rotation in either direction and having a shaft, an arm carried by said shaft to be swung through a path of movement thereby in both directions of rotation of said synchronous motor, said arm being operable to close said normally open switch in one direction of its travel, stops spaced along the path of movement of said arm cooperating with said arm to interrupt the rotation of said synchronous motor and cause reversal thereof in both directions of rotation thereof, and means to adjust the relative positions of said stop means.

7. A collator as defined by claim 6 having a slotted plate overlying said path of movement of said arm, one of said stops being mounted in said slot for adjustment therealong.

8. A collator as defined by claim 6 having a plate including a line of perforations overlying said path of movement of said arm, one of said stops being constructed and arranged for removable mounting in any of said perforations.

9. A collator as defined by claim 6 in which one of said stops comprises a second arm swingable through an arc, and means for releasably securing said second arm in any adjusted position in said arc.

10. In a collator, reciprocable sheet ejecting means, motor means for operating said ejecting means through a collating cycle including a complete reciprocation thereof, an electrical circuit for energizing said motor including a normally closed switch and a normally open switch with said circuit energized upon the closing of either of said switches, means for opening said normally closed switch upon the completion of a collating cycle to open said circuit, and means for momentarily closing said normally open switch after a predetermined time interval to close said circuit and initiate a collating cycle and to cause closing of said normally closed switch, said last mentioned means comprising a synchronous motor reversible upon resistance to rotation in either direction and having a shaft, an arm carried by said shaft to be swung through a path of movement thereby in both directions of rotation of said synchronous motor, said normally open switch lying in said path of movement and adapted to be momentarily closed by said arm, a stop in said path of movement adjacent said normally open switch, an adjustable stop in said path of movement at a point spaced from said first mentioned stop, said stops interrupting swinging of said arm and causing the reversal of said motor.

11. In a collator, reciprocable sheet ejecting means, motor means for operating said ejecting means through a collating cycle including a complete reciprocation thereof, an electrical circuit for energizing said motor including a normally closed switch and a normally open switch with said circuit energized upon the closing of either of said switches, means for opening said normally closed switch upon the completion of a collating cycle to open said circuit, and means for momentarily closing said normally open switch after a predetermined time interval to close said circuit and initiate a collating cycle and to cause closing of said normally closed switch, said last mentioned means comprising a synchronous motor reversible upon resistance to rotation in either direction and having a shaft, an arm carried by said shaft to be swung through a path of movement thereby in both directions of rotation of said synchronous motor, a fixed stop in said path of movement and an adjustable stop in said path of movement, said stops interrupting the swinging movements of said arm and causing reversal of said synchronous motor, said normally open switch being carried by said adjustable stop and being adapted to be closed by said arm as said arm contacts said adjustable stop.

References Cited in the file of this patent

UNITED STATES PATENTS

| | | |
|---|---|---|
| 2,093,384 | Storck et al. | Sept. 14, 1937 |
| 2,449,594 | Druliner | Sept. 21, 1948 |
| 2,558,046 | Geib | June 26, 1951 |
| 2,588,946 | Walden et al. | Mar. 11, 1952 |
| 2,624,571 | Dixon et al. | Jan. 6, 1953 |
| 2,626,149 | Holmberg | Jan. 20, 1953 |
| 2,770,456 | Magarinos et al. | Nov. 13, 1956 |
| 2,808,262 | Keil | Oct. 1, 1957 |